Jan. 31, 1961 A. FERRI ET AL 2,970,202
FORCED-CONVECTION HEATER
Filed March 13, 1957 3 Sheets-Sheet 3

INVENTORS
ANTONIO FERRI
PAUL A. LIBBY
BY MARTIN H. BLOOM
Wade Koontz and
John E. Reidy
ATTORNEYS United States Patent Office 2,970,202
Patented Jan. 31, 1961

2,970,202

FORCED-CONVECTION HEATER

Antonio Ferri, Rockville Centre, Paul A. Libby, Freeport, and Martin H. Bloom, Woodmere, N.Y., assignors to the United States of America as represented by the Secretary of the Air Force Filed Mar. 13, 1957, Ser. No. 645,878

6 Claims. (Cl. 219—39)

The present invention relates to a forced-convection heater adaptable for use either directly, or as a preheater for a compression heater, in aerodynamic testing operations; and more particularly, relates to a forced-convection heater of the capacitive type in which refractory materials are used both as heating elements and heat-storing elements for preparing an air mass in hypersonic wind tunnel testing.

The principal consideration involved in preparing an air mass for flow at hypersonic speeds is to increase the upper limit of the Mach number of the air, this limit being restricted primarily by the commencement of liquefication in the air around the model in the test section at hypersonic speeds. Additional consideraitons include the provision of means for heating the air to extremely high temperatures without the addition of impurities from the source of heat, and to further establish heating and preparation of larger mass flows over extended periods of time. At the same time, the air flow must be controlled in such a way as to present pressures corresponding to the air pressure under the desired free-flight conditions. For example, where it is desired to undertake aerodynamic testing free of component condensation from the air for Mach numbers approaching 15 or to attain full stagnation temperatures for Mach numbers between 5 and 9, the required discharge temperature of the air into the test section must range from 3,000 to 5,000° R. Heretofore it has been exceedingly difficult to provide air at discharge temperatures exceeding 1,800 to 2,000° R. without the severe limitations of mass flows to fractions of a pound per second and for short durations of time only. Furthermore, in former hypersonic wind tunnel operation, it has not been possible to simulate the actual temperatures which exist around an object in flight at Mach numbers 5 and above, but only the ambient temperatures close to the liquefication temperature of air. Accordingly, it is a primary object of the present invention to provide for delivery of air flow simulating free-flight conditions at Mach numbers up to, and in excess of, 15 and in such a way as to eliminate liquefication thereof under simulated flight conditions, and further capable of supplying comparatively high mass flows over relatively long durations of time.

It is another object to provide for delivery of comparatively large mass flows of air at greatly increased stagnation temperatures and in the hypersonic speed range.

It is another object to provide for the capacitive storage of heat energy for the purified heating of an air mass to greatly increased discharge temperatures for use in a hypersonic test facility.

It is an additional object to provide for means to cumulatively store heat in such a way as to effect the uncontaminated transfer of heat to large masses of air flow over relatively long periods of time and at greatly increased stagnation pressures and temperatures.

It is a further object to provide a capacitive type heater which establishes the transfer of heat into a pressure resistant heat storage bed in an air flow channel which is capable of heating air masses to greatly increased discharge temperatures for flow through a hypersonic wind tunnel under simulated free-flight conditions and free of component condensation.

It is still a further object to provide for delivery of air at sufficiently high stagnation temperatures and pressures to premit aerodynamic testing free of liquefication for Mach numbers in excess of 15 and at full stagnation temperatures between Mach numbers 5 and 9.

Other objects and advantages of the present invention may be seen from the following description taken in conjunction with the accompanying drawings, in which:

Fig. 3 is a graph illustrating the variation of tunnel running time with test Mach number for various sizes of nozzles.

Figure 1:
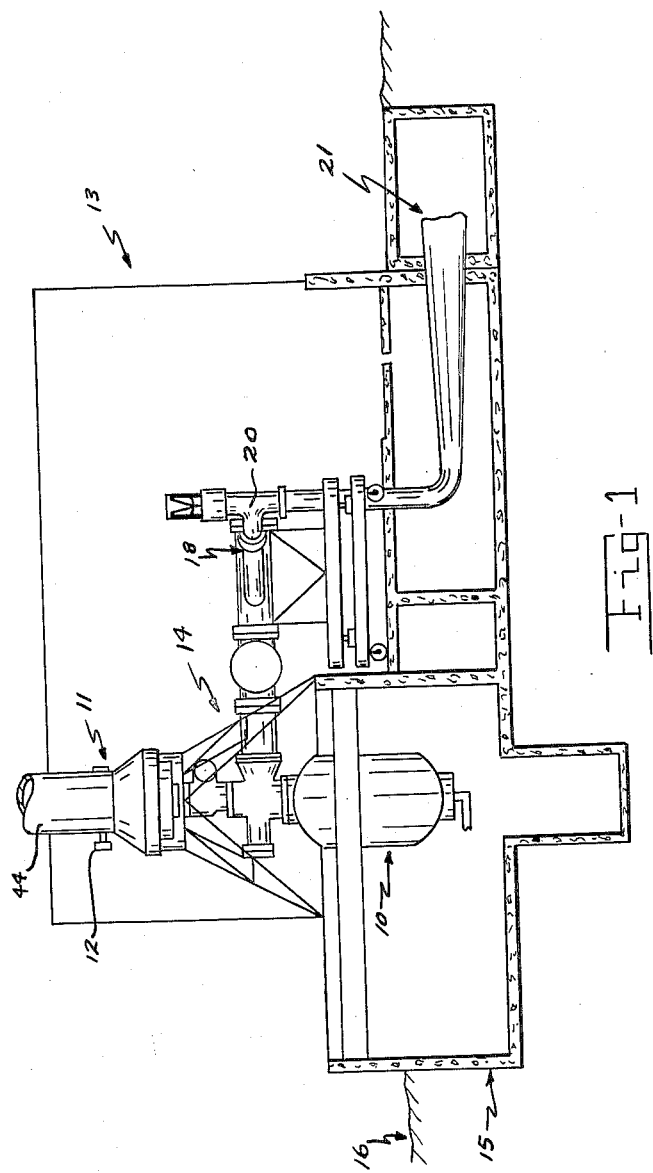
Fig. 1 is a schematic view of a hypersonic test facility.

In Fig. 1 there is shown a forced-convection heater 10 which can be operated either as a preheater prior to adiabatic compression in a compression heater 12 for exhaust at outlet 11 into a tunnel (not shown) or for direct flow into a tunnel 14 for hypersonic testing. As shown, the convection heater 10 is disposed partially below the ground level at 16 and within a removal pit 15. Above the ground level the convection heater together with the tunnels and compression heater are housed in a quonset 13. Air flow through the tunnel 14 is passed through a suitable Y diffuser 18, exhaust system 20 and into a silencer bed 21.

Figure 2:
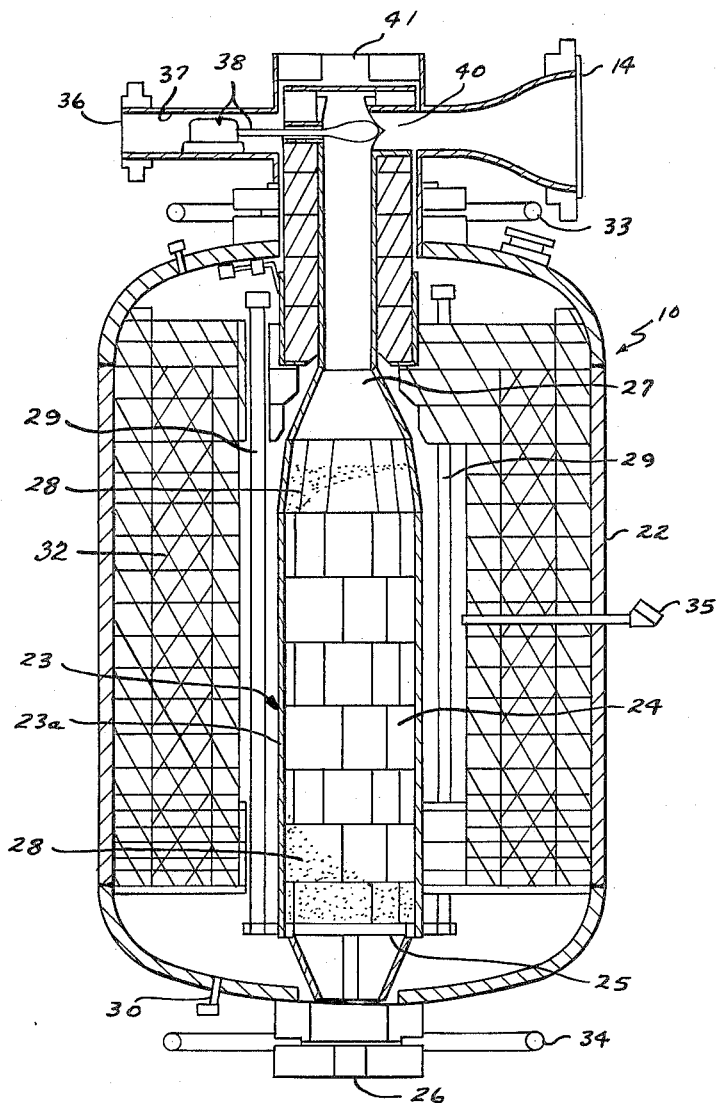
Fig. 2 is an elevational view in section of an illustrative embodiment of the forced-convection heater.
Figure 7:
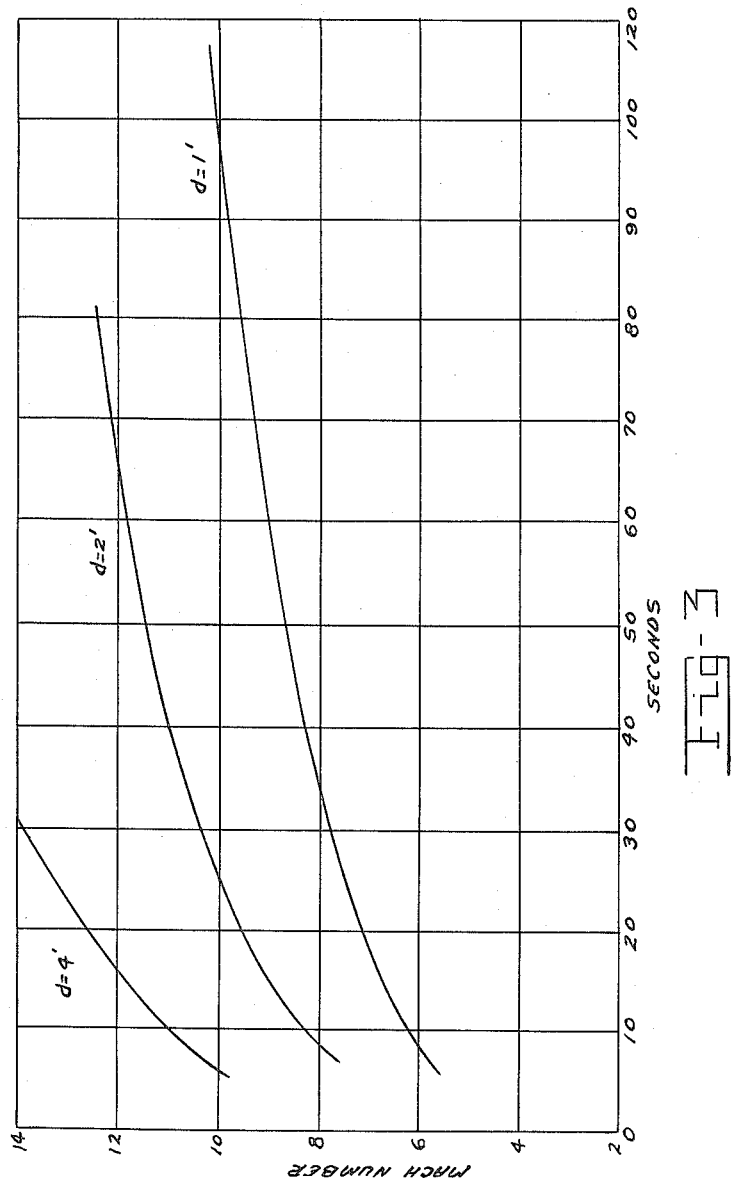

The primary feature of the invention lies essentially in the convection heater 10, as illustrated in Fig. 2 which is made up of an outer, cylindrical, high pressure shell or housing 22 enclosing a vertical conduit or container 23 formed substantially of a silicon carbide lining 23a. The lower portion 24 of the conduit 23 is provided with a ceramic grate 25 extending across the lower end of the vessel. An air inlet duct 26 leads upwardly into the vessel. The upper portion 27 of the conduit 23 converges upwardly and serves as a settling chamber and a discharge passage for the flow of air from the conduit.

Disposed in the vessel on ther gate portion is a ceramic pebble bed 28 which fills roughly two-thirds of the vessel. The grate and container thus cooperate to retain the pebbles therein. The spherical ceramic pebbles constitute heat storing or capacitive elements capable of the capacitive absorption of heat energy to temperatures over 3,000° R. In the preferred embodiment, the pebbles are of an aluminum oxide composition with diameters up to three-eighths of an inch and are made hard, uniform and smooth to prevent chipping and to promote even, capacitive heating. Moreover, the ceramic pebbles are required to display considerable resistance to pressure shock at high temperatures.

To increase the effectiveness in transfer of heat from the pebbles to a quantity of air passing through the pebble bed the pebbles are not kept in place against the air flow by a screen or baffle in the upper portion of the vessel but may be allowed to move freely. For more efficient operation, the pebbles should not move in order to eliminate any opportunity for creation of dust through abrasive action. For this reason, it is advantageous to orient the bed with its axis vertical and to keep the pebbles in place by their own weight. Therefore, in selecting pebbles of varying sizes, it is important to select a pebble diameter of a size which will not be subject to undue tossing or scattering and will not follow the air into the discharge passage.

Encircling the vertical conduit 23 is a series of vertical straight rods 29 which constitute resistance heating elements, preferably of silicon carbide composition. The silicon carbide elements, selected as heat supply means to impart the necessary amount of heat energy by indirect transfer through the walls of the conduit and into the pebble bed, are manufactured by the Carborundum Company under the trade name Globar. They have a service life on the order of 8,000 to 10,000 hours at a surface temperature of 2,800° R., and a reduced life at 3,300° R. Provided at the lower end of the heating elements is an electrical connector 30 including a 230 volt source and multiple tap autotransformers (not shown) to heat the rods up to the desired temperatures as set forth, the heat being transferred from the rods through the walls of the conduit 23 and into the pebble bed by a combination of radiation, conduction and convection.

To insure maximum retention of the heat within the outer shell and insulation of the shell itself, an intermediate, concentric arrangement of temperature resistant, ceramic blocks 28 are disposed between the Globar heating elements 29 and the inner wall of the shell 22 and are also interspaced between the Globar heating elements and adjacent the walls of the settling chamber 27. Due to the extreme heat build-up within the shell, any heat that is conducted outwardly through the insulation and shell portion must be substantially reduced in temperature. This is accomplished by means of water spray rings 33 and 34 disposed at the upper end of the settling chamber 27 and directly beneath the shell portion, respectively. The spray rings are provided with nozzles (not shown) to impinge a stream of coolant or water on the shell portion during the tunnel operation. To indicate the temperature of the heating elements and the area surrounding the vertical conduit, a thermocouple probe attachment 35 is projected through the shell and insulation for this purpose.

In that the air masses directed into the tunnel undergo substantial expansion through the nozzle section of the wind tunnel it is necessary to pressurize the air in some way so as to provide the desired air density upon expansion to simulate altitude conditions under the selected free-flight conditions. In the present invention this is accomplished by providing a high pressure air storage supply (not shown) capable of supplying pressure up to 2,500 p.s.i. and which is attached into a plug valve at 36 and pressure receiving duct 37 leading into the upper end of the settling chamber. A throttling valve 38 is extensible into entrance 40 of the tunnel during the pressurizing stage. The duct 37 and the entrance 41 are each provided with valves (not shown) to permit or prevent communication as desired. By closing off the entrance 40, the air inlet 26, and entrance 41 leading into the compression heater the vertical conduit is sealed for pressurization, the conduit being pressurized usually between 200 and 600 p.s.i.a. so as to relate to the desired pressure upon expansion into the wind tunnel. Once pressurized, the valve 38 can then be retracted to establish communication between the compression heater and the discharge passage to the tunnel.

In carrying out a typical convection heating operation for hypersonic testing, the pebble bed is first heat soaked to the desired operating temperature. It is preferable to program the heating period over a period of a week or two up to full operating temperature. Pressurization of the bed is then carried out up to the desired stagnation pressure. Upon closing the air storage supply duct, ambient air is then introduced through the air inlet into the bottom of the bed from the air storage supply source. As the air passes upwardly through the bed the unconstrained arrangement of the pebbles to provide thorough intermixing with the air, coupled with high pressure in the conduit will combine to establish optimum convection of heat to the air. In that optimum heat transfer can be provided at extremely high temperatures, it is possible to supply comparatively high masses of air flow for operation of the tunnel over relatively long durations of time. Of course, as the air is passed through the vertical conduit, the pebble bed is being continuously heated by the Globar elements, and the spray rings 33 and 34 are operated to provide maximum cooling of the outer shell.

As the air leaves the pebble bed it is increased in velocity in the convergent discharge passage 27 after which it is guided into the wind tunnel nozzle (not shown) which is disposed at right angles to the discharge chamber.

In Fig. 3 there is plotted the variation of running time of the heater with the test Mach number. For example, in establishing air flow into a hypersonic flow nozzle of one foot in diameter in a hypersonic tunnel test section and where a Mach number of 10 is required, the air mass would be heated to a discharge temperature in the settling chamber of 3,000° R. at 600 p.s.i.a. For a vertical heat bed approximately two feet in diameter and eight feet long a designed mass flow up to ten pounds per second could be achieved where it is required to heat air to about 3,000° R. As illustrated on the graph in Fig. 3 the running time required for a Mach number of 10 with a stagnation temperature of 3,000° R. and temperatures of 600 p.s.i.a. would be 95 seconds. With the use of the convection heater of the present invention the duration of running time is limited only by the cooling requirements in the wind tunnel and of instrumentation.

In utilizing the convection heater as a preheater for the compression heater 12, the compression heater is provided to increase the stagnation pressure and temperature of the supply air to attain high Reynold's numbers and to permit tests at higher Mach numbers than is possible with the first stage alone. The compression takes place in a high pressure cylindrical vessel 44 which is driven by expanding cold air from a high pressure air storage system. A brief principal operation is set forth as above with the understanding that the compression heater alone is not claimed as part of the present invention but only in combination with the convection heater as described to further boost the pressure and temperature of the supply air for operation in a second hypersonic test section. With the use of two-stage heating and pressurization, stagnation temperatures of approximately 5,000° R. and stagnation pressures of 2,000 p.s.i.a. have been achieved.

As hereinbefore set forth, it has been possible to attain full stagnation temperatures for Mach numbers from 5 to 9. In additions, air flow at Mach numbers over 15 can be reached with expansion of the air through the nozzle and in the test section completely free of liquefication. Further, simulated pressure conditions corresponding to free-flight at the above extreme Mach numbers can be attained.

Summarizing many of the advantages and aims of the present invention, there has been described a means of pressurizing and indirectly heating comparatively large mass flows of air to a purified, high stagnation temperature, stagnation pressure state for hypersonic testing at extremely high Mach numbers free of component condensation and over extended periods of running time. The present invention further eliminates contamination of the air due to combustion products and the like, utilizes pressure resistant refractories capable of storing heat energy to elevated stagnation temperatures and provides for highly efficient and rapid transfer of heat to large bodies of air by a gravitational means for retaining a heat bed in the channel of air flow.

The nature and objects of the present invention having been thus described and illustrated, what is claimed as new and useful and is desired to be secured by Letters Patent is:

1. A forced-convection heater comprising: an outer, insulated housing having a vertically disposed container therein with a closable gas inlet and convergent discharge passage for the upward, forced flow of air through said container, a plurality of ceramic, heat storing spherical pebbles of uniform diameter disposed within said container, said container having a lower support member for said pebbles, said pebbles being of a weight sufficient to remain substantially in place within said container against the upward flow of gas therethrough and capable of movement to facilitate convective heat transfer, a plurality of rod like resistance heating elements vertically disposed and surrounding said container to indirectly and cumulatively heat said pebbles to a predetermined temperature, and means to pressurize said container to a predetermined pressure.

2. A heater for a wind tunnel system comprising a vertically disposed closable container having an inlet at the base portion thereof, an entrance from a pressure storage source and an unimpeded tunnel entrance, heat storing pebbles disposed in said container, a grate disposed in the base portion of said container for supporting said pebbles, said pebbles being of sufficient weight to resist being thrown into the unimpeded tunnel entrance, sufficiently light in weight to allow easy movement for aiding convection, and sufficiently refractory to withstand and absorb temperatures of the order of 3,000° R., and a plurality of vertical rod heating elements encircling said container.

3. In a forced convection heater for heating gaseous fluid to be discharged to a supersonic wind tunnel test section, an outer high pressure shell, a conduit container for heat storing and for air passage disposed vertically therein, a lower section and an upper restricted-diameter section on said conduit container protruding through the upper opening of said outer shell and having communication to said wind tunnel, a low pressure area surrounding said container, elongated rod shaped heat elements vertically disposed at intervals around the circumference and outside of said conduit container to provide heat to said container and the contents thereof substantially throughout its vertical extent, a grate located in proximity to the lower end of said conduit container, a pebble bed in said conduit container comprising smooth spherical heat storing elements of uniform diameter up to ⅜ inch disposed in said conduit container and filling substantially ⅔ of the capacity thereof, said spherical pebbles being capable of capacity absorption of heat energy to temperatures of the order of 3000° R. and being of a weight to remain within the unrestricted diameter portion of the container, said upper restricted diameter section providing increased velocity in the air travel therethrough, said conduit container and said restricted diameter section being obstruction free.

4. A forced-convection heater of the capacitive type comprising: an outer shell having an inner, vertical conduit passing therethrough, a heat storing bed disposed in said conduit including a transverse grate and a layer of ceramic pebbles defining a capacitive heat source disposed on said grate, a plurality of elongated rod-like electrical heating elements vertically disposed and located at intervals around the circumference and outside of said vertical conduit and within said shell for the indirect transfer of heat energy to said heat bed, means to insulate and cool the walls of said shell, and means to pressurize said conduit up to a predetermined pressure condition, said conduit further including a closable air inlet and a convergent discharge passage to establish acceleration in the upward flow of air through said heat bed.

5. A forced-convection heater of the capacitive type for preparing an air mass for hypersonic flow through a wind tunnel and like devices, comprising: an outer, high pressure shell having an inner, vertical conduit passing therethrough, a heat bed disposed in said conduit including a transverse, ceramic grate at the lower portion of said conduit and a layer of pressure resistant, heat capacitive pebbles disposed on said grate, a plurality of rod-like ceramic heating elements vertically disposed at intervals around the circumference and outside of said conduit and within said shell for the indirect, cumulative transfer of heat to said pebbles, means to insulate and cool the walls of said shell, and means to pressurize the interior of said conduit up to a predetermined pressure, said conduit further including a closable, air inlet passage communicating with the lower end of said conduit for the upward flow of air through said heat bed and an upper, convergent discharge passage for acceleration of the air passing through said heat bed up to sonic speeds.

6. A forced-convection heater of the capacitive type to prepare an air mass for hypersonic wind tunnel operations and the like comprising: an outer, cylindrical, high pressure shell; an inner concentric, vertically disposed conduit including a lower vessel having a ceramic grate extending transversely across the lower end of said vessel, a closable air inlet passage leading upwardly into said vessel and an upper convergent discharge chamber communicating with said vessel; a layer of substantially spherical pebbles disposed on said grate, said pebbles being of a heat capacitive, pressure resistant ceramic composition and of uniform diameter; a plurality of vertical straight-rod heating elements, disposed at intervals around the circumeference of said vessel and said discharge passage for the indirect transfer of heat into said conduit, means disposed between said heating elements and said outer shell for the retention of heat within said shell, together with means to cool the exterior of said shell to a predetermined temperature; and means communicating with said conduit for pressurizing said conduit to a predetermined pressure, said pressurizing means including valve means for closing the upper end of said discharge chamber during pressurization of said conduit whereby air subsequently forced upwardly through said conduit is heated and pressurized to a predetermined stagnation pressure and stagnation temperature.

References Cited in the file of this patent

UNITED STATES PATENTS

| | | |
|---|---|---|
| 1,052,843 | Lawrence | Feb. 11, 1913 |
| 1,381,490 | Offutt | June 14, 1921 |
| 2,654,018 | Sandberg | Sept. 29, 1953 |
| 2,670,426 | Stone | Feb. 23, 1954 |
| 2,748,599 | Keller | June 5, 1956 |
| 2,776,562 | Davie et al. | Jan. 8, 1957 |
| 2,799,159 | Sabol | July 16, 1957 |